United States Patent
Ho

(10) Patent No.: US 9,413,440 B2
(45) Date of Patent: Aug. 9, 2016

(54) METHOD OF ENHANCING SYSTEM PERFORMANCE AND RELATED WIRELESS MODULE

(71) Applicant: Wistron NeWeb Corporation, Hsinchu (TW)

(72) Inventor: Yung-Fa Ho, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 0 days.

(21) Appl. No.: 14/692,752

(22) Filed: Apr. 22, 2015

(65) Prior Publication Data

US 2015/0381245 A1 Dec. 31, 2015

(30) Foreign Application Priority Data

Jun. 27, 2014 (TW) .............................. 103122299 A

(51) Int. Cl.
| | | |
|---|---|---|
| H04B 7/04 | (2006.01) | |
| H04L 27/26 | (2006.01) | |
| H04L 1/00 | (2006.01) | |
| H04B 7/06 | (2006.01) | |
| H04W 52/42 | (2009.01) | |
| H04L 25/03 | (2006.01) | |
| H04L 1/06 | (2006.01) | |
| H04B 3/32 | (2006.01) | |
| H04L 5/00 | (2006.01) | |

(52) U.S. Cl.
CPC ............ *H04B 7/0452* (2013.01); *H04B 7/0617* (2013.01); *H04B 7/0669* (2013.01); *H04B 7/0689* (2013.01); *H04L 1/0009* (2013.01); *H04L 27/26* (2013.01); *H04L 27/2647* (2013.01); *H04B 3/32* (2013.01); *H04L 1/0003* (2013.01); *H04L 1/0071* (2013.01); *H04L 1/06* (2013.01); *H04L 1/0618* (2013.01); *H04L 5/0007* (2013.01); *H04L 25/03343* (2013.01); *H04W 52/42* (2013.01)

(58) Field of Classification Search
CPC ..................... H04L 27/2647; H04L 25/03343; H04L 5/0007; H04L 1/0618; H04L 1/06; H04L 1/0003; H04L 1/0071; H04B 3/32; H04B 7/0669; H04B 7/0689; H04W 52/42
USPC .................................. 375/260, 267, 285, 295
See application file for complete search history.

(56) References Cited

U.S. PATENT DOCUMENTS

| | | | |
|---|---|---|---|
| 2005/0130664 A1 | 6/2005 | Sang | |
| 2007/0127586 A1* | 6/2007 | Hafeez | H04B 7/0634 375/267 |
| 2011/0194475 A1* | 8/2011 | Kim | H04L 1/0053 370/311 |
| 2012/0315938 A1* | 12/2012 | Van Nee | H04B 7/0434 455/507 |

FOREIGN PATENT DOCUMENTS

EP 2 597 804 A1 5/2013

* cited by examiner

*Primary Examiner* — Sam K Ahn
*Assistant Examiner* — Janice Tieu
(74) *Attorney, Agent, or Firm* — Winston Hsu; Scott Margo

(57) ABSTRACT

The present disclosure provides a performance enhancement method for a multi-user multiple input multiple output (MIMO) system. The performance enhancement method includes determining whether a connection node of a data stream matches when a transmission packet is waiting for transmission in the data stream, wherein the data stream is dedicated to serving a wireless subscriber, collecting a plurality of radio-frequency parameters and MIMO information when the connection node matches, using a time-division multiple access (TDMA) mechanism to divide the transmission packet into a plurality of sub-packets, applying Space-time block code (STBC) to the sub-packets, and transmitting the encoded sub-packets in one data stream in different time instants.

18 Claims, 5 Drawing Sheets

METHOD OF ENHANCING SYSTEM PERFORMANCE AND RELATED WIRELESS MODULE

BACKGROUND OF THE INVENTION

1. Field of the Invention

The present invention relates to a method of enhancing performance and related wireless module, and more particularly, to a method of enhancing performance and related wireless module applied to a multi-user multiple input multiple output (MU-MIMO) system.

2. Description of the Prior Art

Currently, wireless communication technology Wi-Fi has a new capability, which is multi-user multiple input multiple output (MU-MIMO) communication. That is, under a multi-user scenario, different data streams may be simultaneously transmitted to multiple wireless subscribers, and each wireless subscriber receives at most four data streams simultaneously. In general, take applications of 4 data streams as an example, allowable combinations of simultaneously transmission wireless subscribers are: a 4×4 wireless subscriber, a 3×3 wireless subscriber plus a 1×1 wireless subscriber, a 2×2 wireless subscriber plus two 1×1 wireless subscribers, or two 2×2 wireless subscribers. Two, three or four 4×4 wireless subscribers are not allowed to perform transmission simultaneously given 4 data streams are provided, which is a current limitation.

SUMMARY OF THE INVENTION

It is therefore a primary objective of the present invention to provide a method of enhancing performance for a multi-user multiple input multiple output (MIMO) system.

The present invention discloses a method of enhancing performance for a multi-user multiple input multiple output (MU-MIMO) system, the method comprising determining whether a connection node of a data stream matches when a transmission packet is waiting for transmission in the data stream, wherein the data stream is dedicated to serve a wireless subscriber; collecting a plurality of radio-frequency parameters and a MIMO information of the connection node when the connection node matches; using a time-division multiple access (TDMA) mechanism to divide the transmission packet into a plurality of sub-packets according to the MIMO information; applying a space-time block code (STBC) to the plurality of sub-packets; and transmitting the plurality of encoded sub-packets in the data stream at different time instants.

The present invention further discloses a wireless module, for a multi-user multiple input multiple output (MU-MIMO) system, the wireless module comprising at least a connection node, for forming a data stream, wherein the data stream is dedicated to serve a wireless subscriber; a database, for collecting a plurality of radio-frequency parameters and a MIMO information; a transmission processing unit, coupled to the database, for using a time-division multiple access (TDMA) mechanism to divide the transmission packet into a plurality of sub-packets according to the MIMO information, the transmission processing unit comprising: a determination unit, for determining numbers of the plurality of sub-packets and defining sizes of the plurality of sub-packets according to the MIMO information when dividing the transmission packet is not completed; and a time dividing unit, for dividing the transmission packet into the plurality of sub-packets according to the numbers of the plurality of sub-packets and the sizes of the plurality of sub-packets and attaching a time tag on each sub-packet of the plurality of sub-packets; an encoding unit, coupled to the transmission processing unit, for applying a space-time block code (STBC) to the plurality of sub-packets; and a radio-frequency module, coupled to the encoding unit, transmitting the plurality of encoded sub-packets in the data stream at different time instants.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
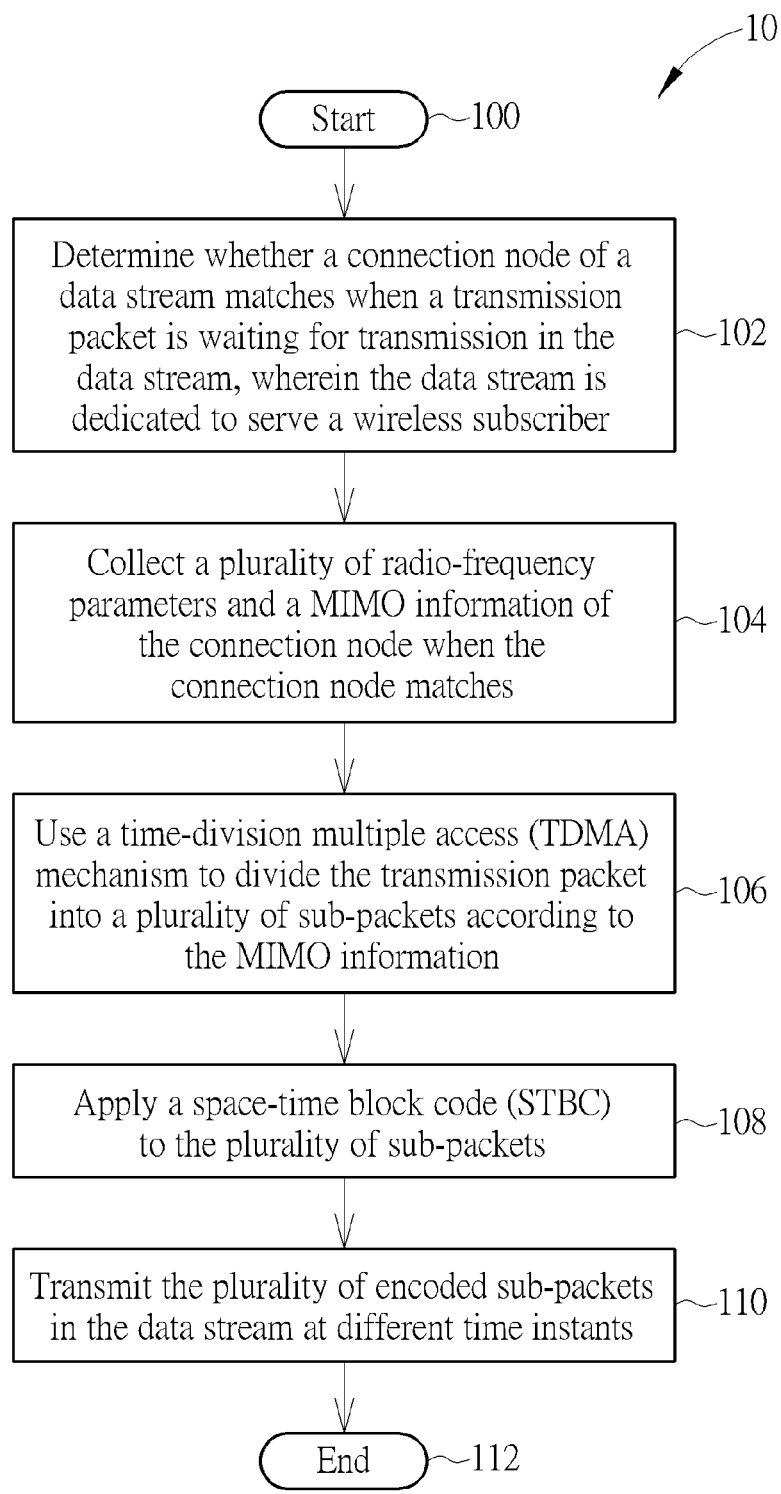
FIG. 1 is a schematic diagram of a performance enhancement process according to an embodiment of the present invention.

Please refer to FIG. 1, which is a schematic diagram of a performance enhancement process 10 according to an embodiment of the present invention. The performance enhancement process 10 is applied for a multi-user multiple-input-multiple-output (MU-MIMO) system, and utilized for maximizing the MU-MIMO system and optimizing transmission capacity. In a multi-user scenario, MU-MIMO system may support different data streams transmitted to multiple wireless subscribers. The performance enhancement process 10 comprises following steps:

Step 100: Start.

Step 102: Determine whether a connection node of a data stream matches when a transmission packet is waiting for transmission in the data stream, wherein the data stream is dedicated to serve a wireless subscriber.

Step 104: Collect a plurality of radio-frequency parameters and a MIMO information of the connection node when the connection node matches.

Step 106: Use a time-division multiple access (TDMA) mechanism to divide the transmission packet into a plurality of sub-packets according to the MIMO information.

Step 108: Apply a space-time block code (STBC) to the plurality of sub-packets.

Step 110: Transmit the plurality of encoded sub-packets in the data stream at different time instants.

Step 112: End.

According to the performance enhancement process 10, the MU-MIMO system initially collects the plurality of radio-frequency (RF) parameters and the MIMO information of the connection node by a self-training mechanism, and establishes a database of the connection node according to the plurality of RF parameters and the MIMO information. Moreover, the self-training mechanism is standardized in Wi-Fi standard, which is not narrated herein for brevity. The MU-MIMO system determines numbers of dividing sub-packets and defines sizes of the sub-packets according to the MIMO information. Preferably, the MIMO information is a MIMO configuration of the subscriber (e.g., 1×1, 2×2, 3×3, 4×4). The plurality of RF parameters comprises at least one of a transmission power, a packet error rate, an information rate and a received signal strength indication (RSSI). Next, the MU-MIMO system uses a time-division multiple access (TDMA) mechanism to divide the transmission packet into a plurality of sub-packets according to the MIMO information, and applies a space-time block code (STBC) to the plurality of sub-packets. Moreover, TDMA mechanism and STBC are known by those skilled in the art, and not narrated herein for brevity. Furthermore, the MU-MIMO system transmits the plurality of encoded sub-packets in the data stream at different time instants. Therefore, the performance enhancement process 10 may virtualize the MU-MIMO system transmitting data packet in a physical single data stream, to achieve a purpose of self-planning on data stream. Furthermore, the MU-MIMO system may service multiple subscribers through different data streams at the same time, wherein each data stream is dedicated for a wireless subscriber, and not limited to the MIMO configurations of the wireless subscribers (i.e., not limited to the wireless subscribers being 2×2, 3×3 or 4×4). In other words, multiple wireless subscribers may perform data transmission at the same time through different single data streams. Notably, besides the MU-MIMO system, the performance enhancement process 10 may be applied to a single-input-single-output system. In addition, the data stream is formed by a single beam or multiple beams, and not limited herein.

Figure 2A:
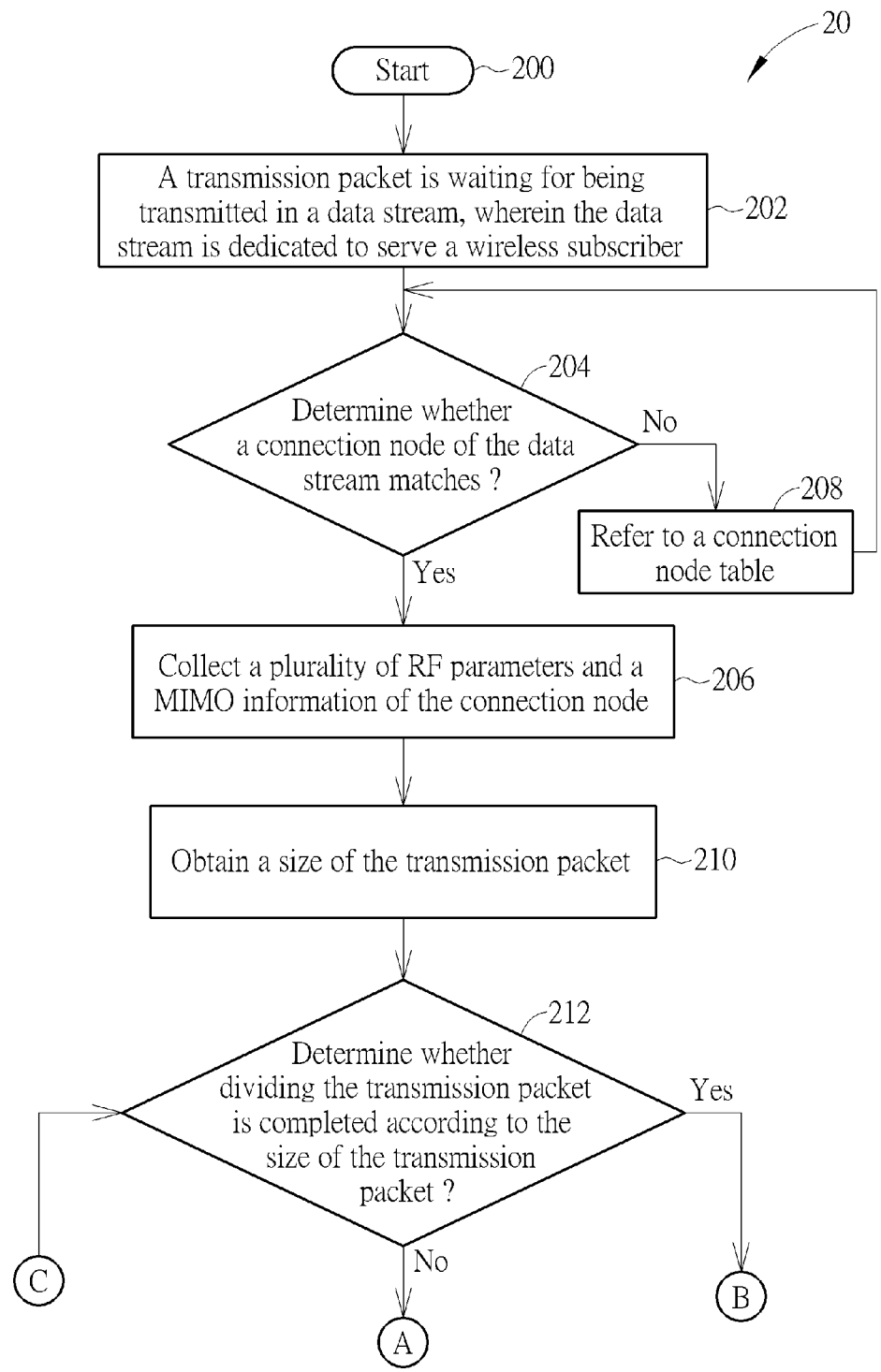
FIGS. 2A and 2B are schematic diagrams of a first part and a second part of a performance enhancement process according to an embodiment of the present invention.
Figure 2B:
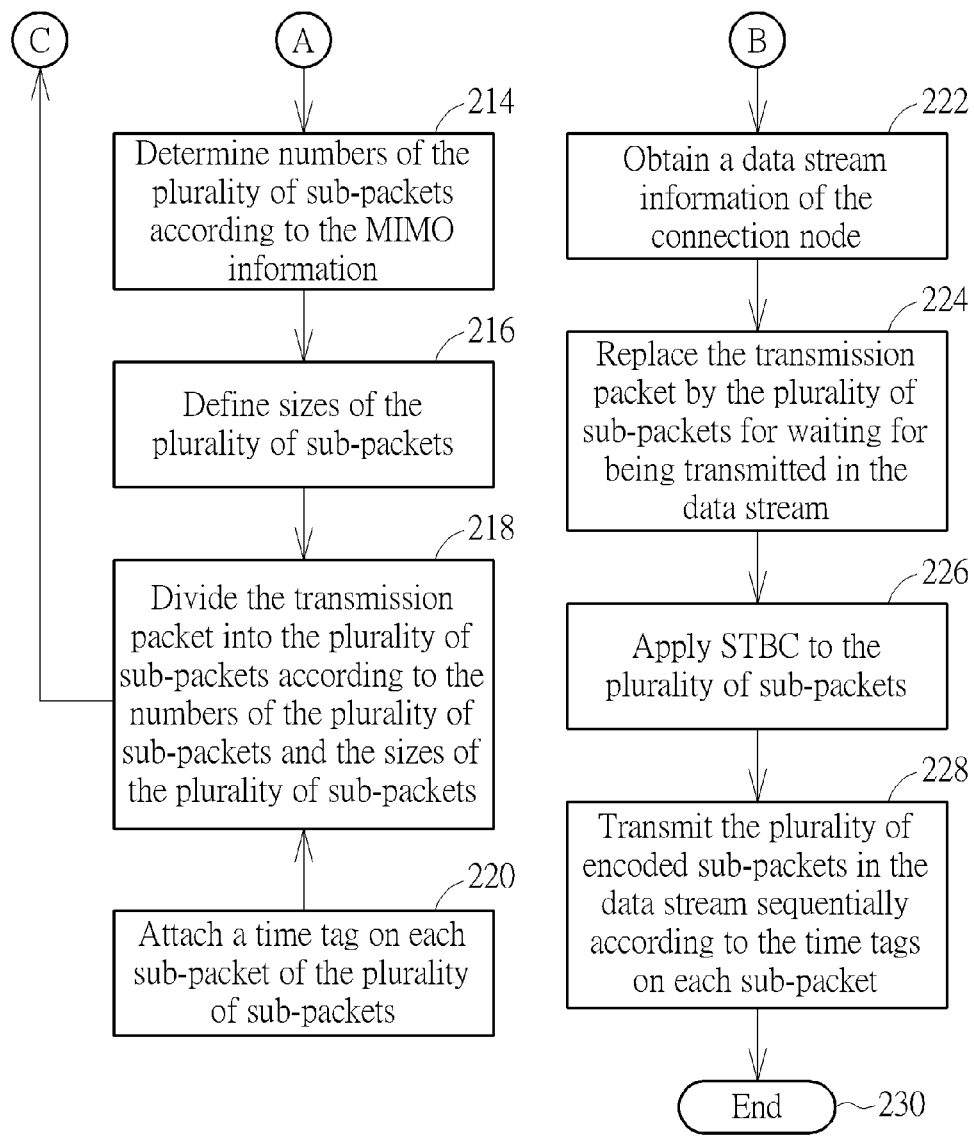

Notably, the performance enhancement process 10 illustrated in FIG. 1 is a schematic diagram of an embodiment of the present invention. Those skilled in the art may make modification and alternation accordingly, and not limited herein. Please refer to FIGS. 2A and 2B, which are schematic diagrams of a first part and a second part of a performance enhancement process 20 according to an embodiment of the present invention. The performance enhancement process 20 is a variation of the performance enhancement process 10. The performance enhancement process 20 comprises following steps:

Step 200: Start.

Step 202: A transmission packet is waiting for being transmitted in a data stream, wherein the data stream is dedicated to serve a wireless subscriber.

Step 204: Determine whether a connection node of the data stream matches. If yes, go to Step 206; if not, go to Step 208.

Step 206: Collect a plurality of RF parameters and a MIMO information of the connection node, and go to Step 210.

Step 208: Refer to a connection node table, and go to Step 204.

Step 210: Obtain a size of the transmission packet.

Step 212: Determine whether dividing the transmission packet is completed according to the size of the transmission packet. If yes, go to Step 222; if not, go to Step 214.

Step 214: Determine numbers of the plurality of sub-packets according to the MIMO information.

Step 216: Define sizes of the plurality of sub-packets.

Step 218: Divide the transmission packet into the plurality of sub-packets according to the numbers of the plurality of sub-packets and the sizes of the plurality of sub-packets.

Step 220: Attach a time tag on each sub-packet of the plurality of sub-packets.

Step 222: Obtain a data stream information of the connection node.

Step 224: Replace the transmission packet by the plurality of sub-packets for waiting for being transmitted in the data stream.

Step 226: Apply STBC to the plurality of sub-packets.

Step 228: Transmit the plurality of encoded sub-packets in the data stream sequentially according to the time tags on each sub-packet.

Step 230: End.

Common parts of the performance enhancement process 20 and the performance enhancement process 10 are not narrated for brevity. Step 210-Step 220 is utilized for implementing Step 106 in the performance enhancement process 10. The MU-MIMO system determines whether dividing the transmission packet is completed according to the size of the transmission packet. The MU-MIMO system determines the numbers of the plurality of sub-packets and defines the sizes of the plurality of sub-packets according to the MIMO information when dividing the transmission packet is not completed. Next, the MU-MIMO system divides the transmission packet into the plurality of sub-packets according to the numbers of the plurality of sub-packets and the sizes of the plurality of sub-packets, and attaches a time tag on each sub-packet of the plurality of sub-packets. When dividing the transmission packet is completed, the MU-MIMO system applies STBC to the plurality of sub-packets, and transmits the encoded sub-packets in the data stream sequentially according to the time tags on each sub-packet. Moreover, transmission of two adjacent sub-packets has a delay time t. Preferably, the delay time t may be further adjusted according to a media access control (MAC) period.

Therefore, the performance enhancement process 10 may virtualize the MU-MIMO system transmitting data packet in a physical single data stream, to achieve a purpose of self-planning on data stream. Furthermore, the MU-MIMO system may service multiple subscribers through different data streams at the same time, wherein each data stream is dedicated for a wireless subscriber, and not limited to the MIMO configurations of the wireless subscribers.

In short, the performance enhancement process 10 and the performance enhancement process 20 utilize the time-division multiple access (TDMA) mechanism to divide the transmission packet into the plurality of sub-packets according to the MIMO information, and transmit the plurality of encoded sub-packets in the data stream at different time instants. Hence, multiple wireless subscribers may perform data transmission at the same time through different data streams. The multiple wireless subscribers also retain transmission qualities of dedicated beams at the same time. Furthermore, performance of the MU-MIMO system is improved and transmission capacity is optimized (e.g., increase number of serving wireless subscribers). For example, if the MU-MIMO system provides 4 data streams, at most four 4×4 wireless subscribers are served at the same time.

Figure 3:
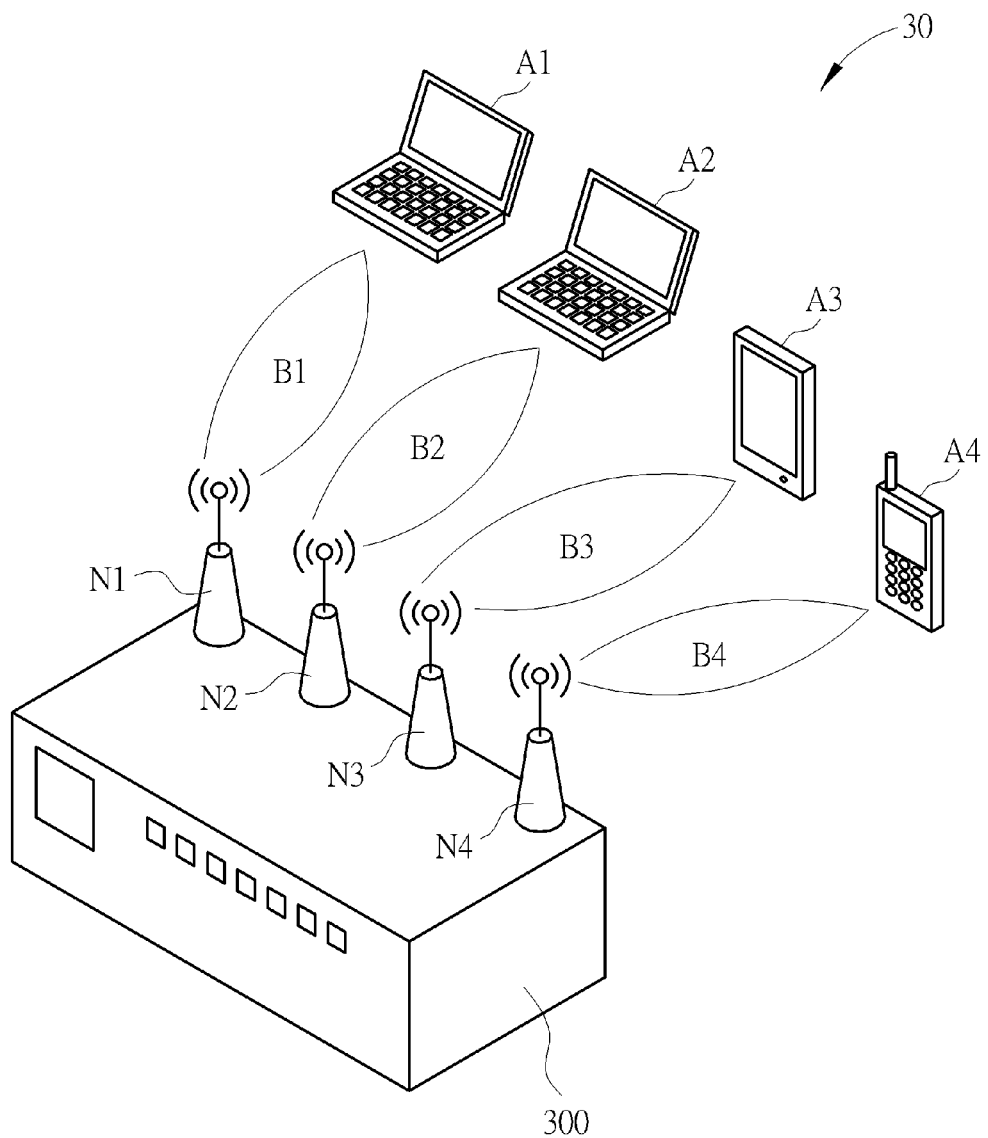
FIG. 3 is a schematic diagram of a multi-user MIMO system according to an embodiment of the present invention.

Please refer to FIG. 3, which is a schematic diagram of a MU-MIMO system according to an embodiment of the present invention. The MU-MIMO system 30 comprises a wireless module 300 and multiple wireless subscribers A1, A2, A3 and A4. The wireless module 300 comprises four connection nodes N1, N2, N3 and N4. The connection nodes N1, N2, N3 and N4 form four data streams B1, B2, B3 and B4, to serve the wireless subscribers A1, A2, A3 and A4, respectively. Moreover, the wireless subscriber A1 is a 4×4 wireless subscriber; the wireless subscriber A2 is a 3×3 wireless subscriber; the wireless subscriber A3 is a 2×2 wireless subscriber; the wireless subscriber A4 is a 1×1 wireless subscriber. The wireless module 300 uses TDMA to divide the transmission packet into multiple sub-packets according to the MIMO information (i.e., MIMO configuration of wireless subscribers). For example, for the 2×2 wireless subscriber (e.g., the wireless subscriber A3), the wireless module 300 divides the transmission packet into 2 parts. For the 3×3 wireless subscriber (e.g., the wireless subscriber A2), the wireless module 300 divides the transmission packet into 3 parts. For the 4×4 wireless subscriber (e.g., the wireless subscriber A1), the wireless module 300 divides the transmission packet into 4 parts. Next, the wireless module 300 attaches the time tags on the divided sub-packets, and applies STBC to the sub-packets. The wireless module 300 transmits the encoded sub-packets in the data stream sequentially according to the time tags on each sub-packet. The subscriber capacity of the MU-MIMO system 30 is increased, such that the MU-MIMO system 30 serves four subscribers at the same time. Interference in between may also be reduced. In other words, the wireless module 300 performs management on the connection nodes N1, N2, N3 and N4 by virtualizing as single data streams, such that the four data streams serve four wireless subscribers independently at the same time.

Figure 4:
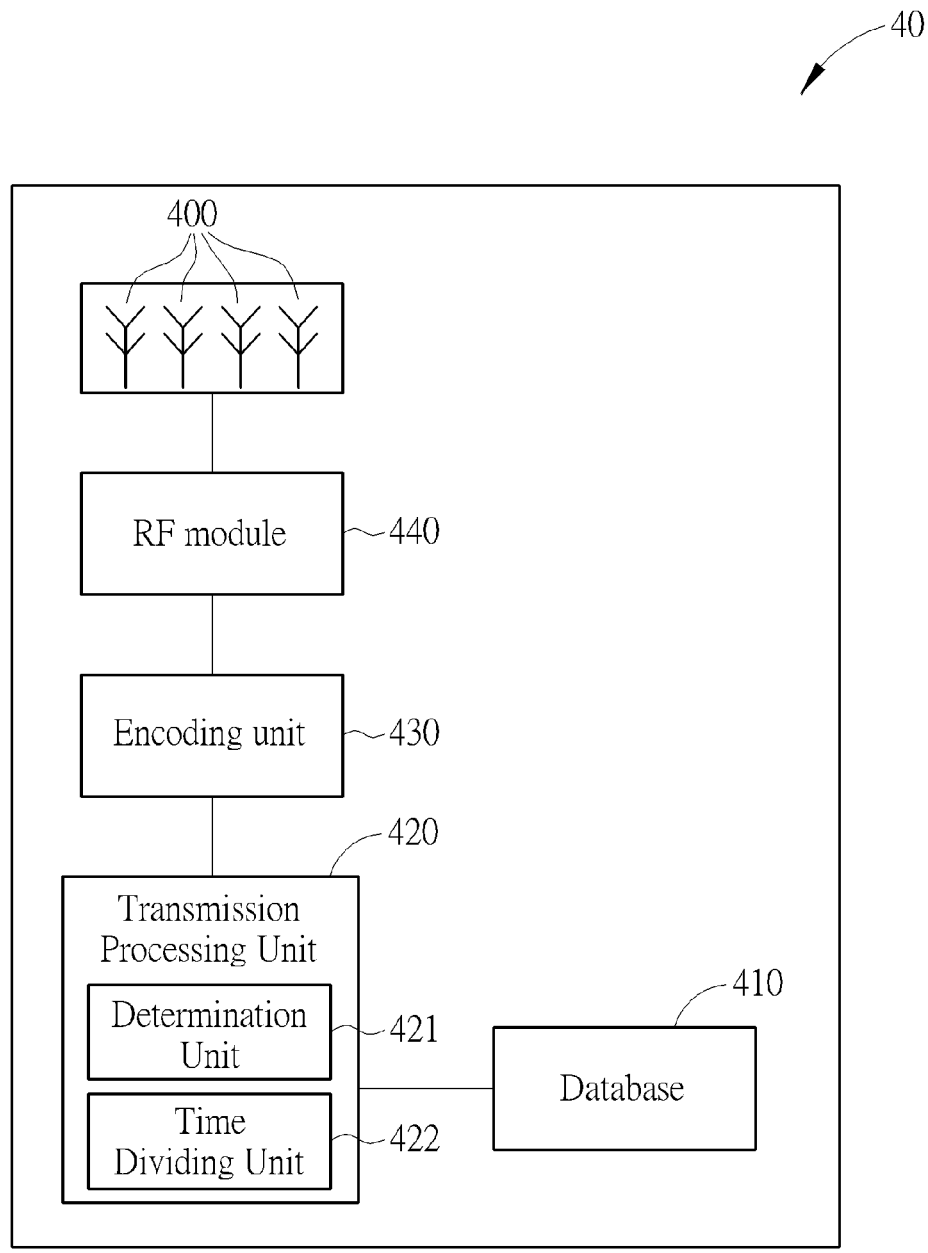
FIG. 4 is a schematic diagram of a wireless module according to an embodiment of the present invention.

The implementation method of the performance enhancement process 10 and the performance enhancement process 20 may be referred to FIG. 4, which is a schematic diagram of a wireless module 40 according to an embodiment of the present invention. The wireless module 40 may be utilized for realizing the wireless module 300 in FIG. 3. The wireless module 40, preferably, may be an access point (AP). The wireless module 40 comprises at least a connection node 400, a database 410, a transmission processing unit 420, an encoding unit 430 and an RF module 440. The at least a connection node 400 is utilized for forming a data stream, wherein the data stream is dedicated to serve a wireless subscriber. The database 410 is utilized for collecting a plurality of radio-frequency parameters and a MIMO information. The transmission processing unit 420 is coupled to the database 410, for using the TDMA mechanism to divide the transmission packet into a plurality of sub-packets according to the MIMO information. The transmission processing unit 420 comprises a determination unit 421 and a time dividing unit 422. The determination unit 421 is utilized for determining numbers of the plurality of sub-packets and defining sizes of the plurality of sub-packets according to the MIMO information when dividing the transmission packet is not completed. The time dividing unit 422 is utilized for dividing the transmission packet into the plurality of sub-packets according to the numbers of the plurality of sub-packets and the sizes of the plurality of sub-packets, and for attaching a time tag on each sub-packet of the plurality of sub-packets. The time dividing unit 422 may be a TDMA module, for performing the TDMA mechanism. The encoding unit 430 is utilized for applying an STBC to the plurality of sub-packets. The RF module 440 is utilized for transmitting the plurality of encoded sub-packets at different time instants. The detail operations of the wireless module 40 may be referred to the performance enhancement process 10 and the performance enhancement process 20 stated in the above, which are not narrated for brevity.

In summary, the embodiments of the present invention determine the numbers of the sub-packets, process the TDMA mechanism, attach the time tags on the divided sub-packets, and transmit the encoded sub-packets sequentially according to the time tags in the single data stream. Hence, the data streams of the multiple wireless subscribers may serve dedicated wireless subscribers at the same time. The multiple wireless subscribers also retain dedicated transmission qualities, such that performance of the MU-MIMO system is improved and transmission capacity is increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of enhancing performance for a multi-user multiple input multiple output (MIMO) system, the method comprising:
    determining whether a connection node of a data stream matches when a transmission packet is waiting for transmission in the data stream, wherein the data stream is dedicated to serve a wireless subscriber;
    using a self-training mechanism to collect a plurality of radio-frequency parameters and a MIMO information of the connection node when the connection node matches;
    using a time-division multiple access (TDMA) mechanism to divide the transmission packet into a plurality of sub-packets according to the MIMO information;
    applying a space-time block code (STBC) to the plurality of sub-packets; and
    transmitting the plurality of encoded sub-packets in the data stream at different time instants.

2. The method of claim 1, further comprising:
    referring to a connection node table when the connection node does not match; and
    obtaining a data stream information of the connection node after the transmission packet being divided into the plurality of sub-packets, and replacing the transmission packet with the plurality of sub-packets to wait for transmission in the data stream.

3. The method of claim 1, wherein the step of using the time-division multiple access (TDMA) mechanism to divide the transmission packet into the plurality of sub-packets according to the MIMO information comprises:
    obtaining a size of the transmission packet;
    determining whether dividing the transmission packet is completed according to the size of the transmission packet;
    determining numbers of the plurality of sub-packets and defining sizes of the plurality of sub-packets according to the MIMO information when dividing the transmission packet is not completed;
    dividing the transmission packet into the plurality of sub-packets according to the numbers of the plurality of sub-packets and the sizes of the plurality of sub-packets; and
    attaching a time tag on each sub-packet of the plurality of sub-packets.

4. The method of claim 3, wherein the step of transmitting the plurality of encoded sub-packets in the data stream at the different time instants further comprises:
    transmitting the plurality of encoded sub-packets sequentially according to the time tag on each of the sub-packet, wherein transmission of two adjacent sub-packets has a delay time.

5. The method of claim 1, wherein the plurality of radio-frequency parameters comprises at least one of a transmission power, a packet error rate, an information rate and a received signal strength indication (RSSI).

6. The method of claim 1, wherein the MIMO information is a MIMO configuration of the wireless subscriber.

7. The method of claim 1, wherein the data stream is formed by a beam or multiple beams.

8. A wireless module, for a multi-user multiple input multiple output (MU-MIMO) system, the wireless module comprising:
    at least a connection node, for forming a data stream, wherein the data stream is dedicated to serve a wireless subscriber;

a database, for using a self-training mechanism to collect a plurality of radio-frequency parameters and a MIMO information;

a transmission processing unit, coupled to the database, for dividing the transmission packet into a plurality of sub-packets according to the MIMO information, the transmission processing unit comprising:

a determination unit, for determining numbers of the plurality of sub-packets and defining sizes of the plurality of sub-packets according to the MIMO information when dividing the transmission packet is not completed; and a time dividing unit, for using a time-division multiple access (TDMA) mechanism to divide the transmission packet into the plurality of sub-packets according to the numbers of the plurality of sub-packets and the sizes of the plurality of sub-packets and attaching a time tag on each sub-packet of the plurality of sub-packets;

an encoding unit, coupled to the transmission processing unit, for applying a space-time block code (STBC) to the plurality of sub-packets; and a radio-frequency module, coupled to the encoding unit, transmitting the plurality of encoded sub-packets in the data stream at different time instants.

9. The wireless module of claim 8, wherein the radio-frequency module is further utilized for determining whether a connection node of the at least a connection node matches when the transmission packet is waiting for transmission in the data stream.

10. The wireless module of claim 9, further comprising a connection node table, for being referred when the connection node does not match.

11. The wireless module of claim 8, wherein the transmission processing unit is further utilized for obtaining a size of the transmission packet, obtaining a data stream information of the connection node after the transmission packet being divided into the plurality of sub-packets, and replacing the transmission packet with the plurality of sub-packets to wait for transmission in the data stream.

12. The wireless module of claim 11, wherein the determination unit is further utilized for determining whether dividing the transmission packet is completed according to the size of the transmission packet.

13. The wireless module of claim 8, wherein the radio-frequency module is further utilized for transmitting the plurality of encoded sub-packets sequentially according to the time tag on each of the sub-packet, wherein transmission of two adjacent sub-packet has a delay time.

14. The wireless module of claim 8, wherein the plurality of radio-frequency parameters comprises at least one of a transmission power, a packet error rate, an information rate and a received signal strength indication (RSSI).

15. The wireless module of claim 8, wherein the MIMO information is a MIMO configuration of the wireless subscriber.

16. The wireless module of claim 8, wherein the data stream is formed by a beam or multiple beams.

17. A method of enhancing performance for a multi-user multiple input multiple output (MIMO) system, the method comprising:

forming a data stream by a connection node;

using a self-training mechanism to collect a plurality of radio-frequency parameters and a MIMO information of the connection node;

using a time-division multiple access (TDMA) mechanism to divide the transmission packet into a plurality of sub-packets according to the MIMO information;

applying a space-time block code (STBC) to the plurality of sub-packets; and transmitting the plurality of encoded sub-packets in the data stream at different time instants.

18. The method of claim 17, wherein the MIMO information is a MIMO configuration of the wireless subscriber.

* * * * *